(12) United States Patent
Heigl

(10) Patent No.: US 6,467,802 B2
(45) Date of Patent: Oct. 22, 2002

(54) GAS BAG MODULE FOR VEHICLE OCCUPANT RESTRAINT SYSTEMS

(75) Inventor: Jürgen Heigl, Böbingen (DE)

(73) Assignee: TRW Occupant Restraint Systems GmbH & Co. KG, Alfdorf (DE)

( * ) Notice: Subject to any disclaimer, the term of this patent is extended or adjusted under 35 U.S.C. 154(b) by 0 days.

(21) Appl. No.: 09/833,971

(22) Filed: Apr. 12, 2001

(65) Prior Publication Data
US 2001/0048219 A1 Dec. 6, 2001

(30) Foreign Application Priority Data
May 23, 2000 (DE) ........................................ 200 09 237

(51) Int. Cl.⁷ ............................................. B60R 21/24
(52) U.S. Cl. .................. 280/729; 280/730.2; 280/743.1
(58) Field of Search .............................. 280/743.1, 742, 280/740, 741, 730.1, 730.2, 729

(56) References Cited
U.S. PATENT DOCUMENTS 5,492,363 A * 2/1996 Hartmeyer et al. ......... 280/739
5,634,659 A * 6/1997 Abraham ..................... 280/739
5,692,777 A * 12/1997 Tochacek et al. ......... 280/743.1
5,884,574 A * 3/1999 Sogi et al. ................... 112/441
6,283,507 B1 * 9/2001 Kami et al. .............. 280/743.1

FOREIGN PATENT DOCUMENTS

| DE | 29914637 | 1/2000 |
| DE | 19939618 | 5/2000 |
| WO | 9951466 | 10/1999 |

* cited by examiner

Primary Examiner—Paul N. Dickson
Assistant Examiner—Faye M. Fleming
(74) Attorney, Agent, or Firm—Tarolli, Sundheim, Covell, Tummino & Szabo L.L.P.

(57) ABSTRACT

A gas bag module for a vehicle occupant restraint system includes a gas bag having at least a first fabric layer which is made of interwoven weft threads and warp threads and which forms a wall of the gas bag. The gas bag module also includes a gas lance with openings for an inflow of a gas into the gas bag. A second fabric layer is disposed in the area of the openings and is formed by part of the weft threads of the first fabric layer.

7 Claims, 1 Drawing Sheet

GAS BAG MODULE FOR VEHICLE OCCUPANT RESTRAINT SYSTEMS

TECHNICAL FIELD

The invention relates to a gas bag module for vehicle occupant restraint systems.

BACKGROUND OF THE INVENTION

Known gas bag modules communicate with a gas generator which upon its activation provides a pressurized hot gas passed into the gas bag to inflate the same. Because of the elevated temperature the hot gases can damage the material of the gas bag wall so that the gas permeability of the gas bag is changed in an unwanted manner and its restraint function can be impaired. Burn injuries of the vehicle occupant can also occur because of the uncontrolled release of the hot gases.

In order not to damage the gas bag fabric when the propellant charge is ignited, there are various conceptions effecting that the hot gas cannot damage the gas bag wall. According to one conception, a heat-degrading agent is used which is provided on the inner surface of the wall of the gas bag. Upon contact with the hot gases the heat-degrading agent is subjected to a physical or chemical change of its state of matter or its structure, thermal energy being taken up. As a result; the temperature of the gases is lowered before the gases come into contact with the fabric from which the gas bag wall is made. The heat-degrading agent can be plastic threads which are interlaced in the gas bag fabric. The threads can either be made of a material having a melting point lower than that of the gas bag material or the threads may be made from a material the same as that of the gas bag but only with roughened and thus enlarged surface. Because of the lower melting temperature or the greater contact surface the interwoven threads in front of the gas bag wall start melting. In another conception, the inner wall of the gas bag is dusted with a substance which decomposes from a certain temperature on and which takes the thermal energy necessary for the decomposition reaction from the gas. In another conception, a separate fabric layer is inserted in the interior of the gas bag, which layer prevents a direct contact of the hot gas with the wall of the gas bag.

In order to obtain a flame protection for the wall of the gas bag, a material differing from the actual wall material is inserted in the gas bag in all of these conceptions. This requires markedly increased production costs.

BRIEF SUMMARY OF THE INVENTION

The object of the invention consists in further developing a gas bag of the initially mentioned kind so as to obtain a flame protection with less expenses and less costs.

This is achieved in a gas bag module which comprises at least a first fabric layer which is made of interwoven weft threads and warp threads and which forms a wall of a gas bag. The gas bag module further comprises a gas lance which is provided with openings for an inflow of a gas into the gas bag and at least a second fabric layer. The second fabric layer is disposed in the area of the openings and is formed by part of the weft threads of the first fabric layer. The conception underlying the invention consists in "branching off" part of the weft threads of the gas bag wall to obtain a flame-protecting fabric layer. Thus, the flowing-in hot gas first strikes upon the second fabric layer in the area of the openings and protects the actual gas bag wall from the flowing-out hot gas. The additional fabric layer can be destroyed by the elevated gas temperature without the restraint function of the gas bag being impaired by this. Since the second fabric layer serving as a flame protection is no separate part but can be produced in the same phase of operation when the wall of the gas bag is woven, the production costs are especially low.

DETAILED DESCRIPTION OF THE PREFERRED EMBODIMENT

Figure 1:
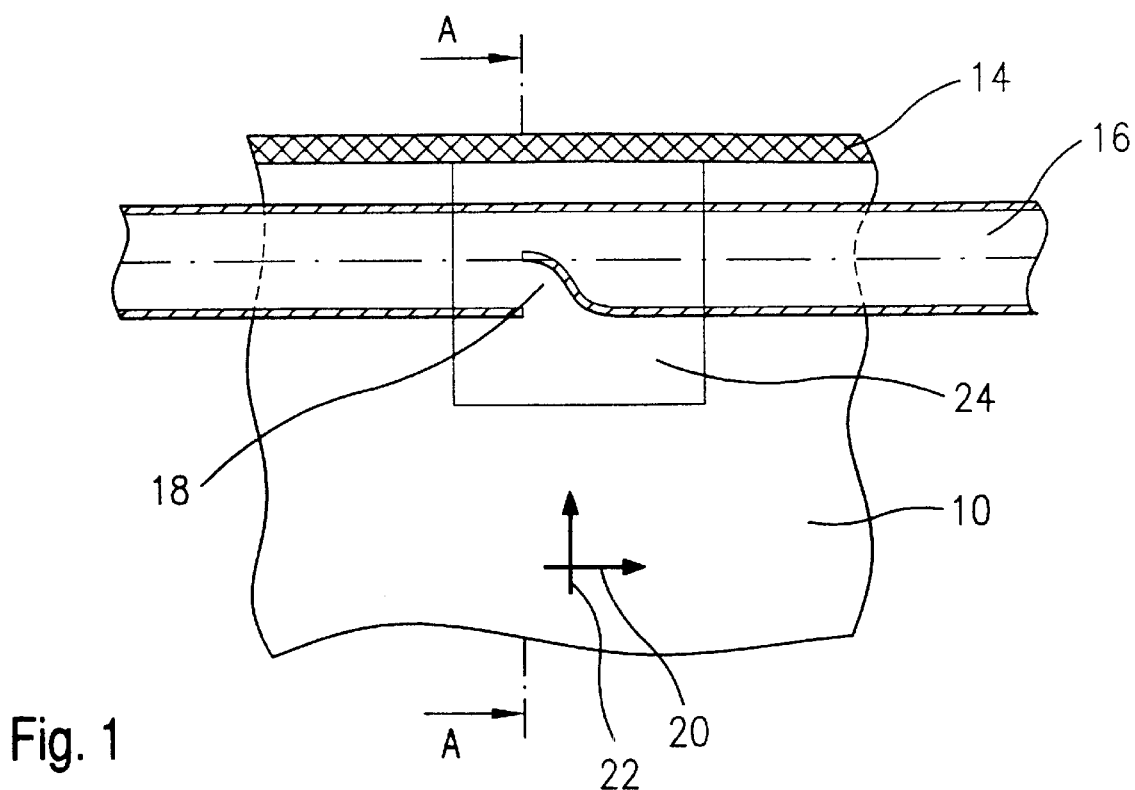
FIG. 1 shows a side gas bag module according to the invention in a longitudinal section.

In FIG. 1, a side gas bag module is shown which has a first fabric layer 10 which forms part of the gas bag wall. The part of the wall opposite this fabric layer is formed by another first fabric layer 12 shown in FIG. 2. The two first fabric layers 10 and 12 are connected with each other at their upper end with respect to FIG. 1 by means of an interweaving 14. A panama connection is used for this.

Figure 2:
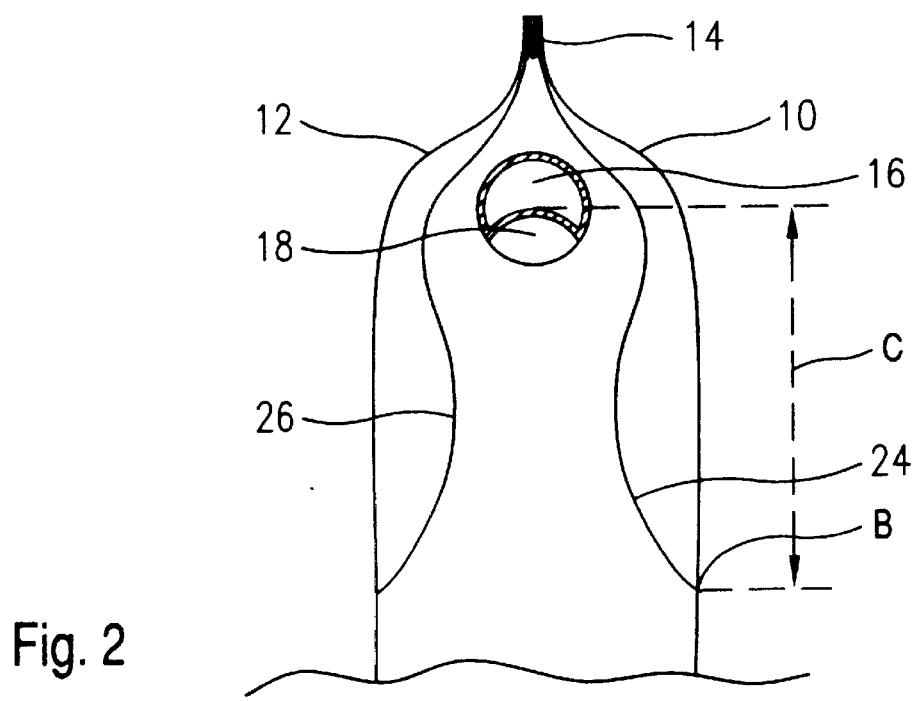
FIG. 2 shows a side gas bag module of FIG. 1 according to the invention in a cross-section along line A—A.

A gas lance 16 having a gas inlet opening 18 is disposed along the interweaving 14 of the two first fabric layers 10 and 12. The gas lance serves for distributing a pressurized gas which is provided for inflating the gas bag in the interior of the gas bag. FIG. 2 shows that in the area of the opening 18 an additional second fabric layer 24 and 26, respectively, is disposed on either side of the wall (see also FIG. 1). The two second fabric layers 24 and 26 start underneath the interweaving 14 and are combined again at a point B which is disposed at a distance C from the opening 18 with the corresponding first fabric layer 10 or 12 to give a respective point fabric layer.

Each second fabric layer 24, 26 is formed by part of the weft threads of the first fabric layer in this area . The second fabric layer is thus produced simply by separating part of the weft threads from the other weft threads when the fabric layer 10, 12 is woven. In this connection, preferably half of the weft threads of the fabric layer 10, 12 are separated. The warp and weft threads "remaining" for the first fabric layer still suffice for a fabric which has the desired mechanical and thermal strength and the requested gas tightness.

The fabric is used for the gas bag such that the warp threads 20 of the gas bag wall extend approximately parallel to the edge of the gas bag, opposed to the gas lance, i.e. here the lower edge, whereas the weft threads 22 extend perpendicularly thereto.

When the gas generator is ignited hot gas which may have temperatures of up to 1400 K flows through the gas lance 16 and through the opening 18 into the gas bag. Before the hot gas can come into contact with the first fabric layer 10, 12, it strikes upon the second fabric layer 24, 26 which is disposed directly in the flowing-in direction in front of the opening 18. Thus, a direct striking of the hot gas onto the actual wall of the gas bag and a damage of the wall is prevented. Even if the second fabric layer is melted towards the end of the inflating process, the hot gas cannot damage the first fabric layer 10, 12 within the remaining short time of the inflating process.

According to a further development which is not shown the gas bag wall can be coated e.g. with a sheet to ensure sufficient gas tightness independent of the weave density of the gas bag wall.

What is claimed is:

1. A gas bag module for a vehicle occupant restraint system, the gas bag module comprising a gas bag having at least a first fabric layer made of interwoven weft threads and warp threads and forming a wall of said gas bag, a gas lance with openings for an inflow of a gas into said gas bag, and a second fabric layer which is disposed in an area of said openings and formed by part of said weft threads of said first fabric layer.

2. The gas bag according to claim 1, wherein two first fabric layers are provided which are interwoven at least in some regions.

3. The gas bag according to claim 2, wherein said first two fabric layers are interwoven by a panama weave.

4. The gas bag according to claim 1, wherein said weft threads of said first fabric layer extend approximately perpendicularly to an edge of said gas bag, which edge is opposed to said gas lance, and wherein said warp threads extend approximately parallel to this edge of said gas bag.

5. The gas bag according to claim 1, wherein said wall is coated.

6. The gas bag according claim 1, wherein said second fabric layer is formed by half the weft threads of said first fabric layer.

7. A gas bag module for a vehicle occupant restraint system, the gas bag module comprising a gas bag having at least a first fabric layer made of interwoven weft threads and warp threads and forming a wall of said gas bag, a gas lance with at least one opening for an inflow of a gas into said gas bag, and a second fabric layer which is disposed in an area of said at least one opening and formed by part of said weft threads of said first fabric layer, at least a portion of said inflow of said gas into said gas bag striking upon said second fabric layer to protect said first fabric layer from said inflow of gas.

* * * * *